(12) United States Patent
Kruempelmann (10) Patent No.: US 10,726,371 B2
(45) Date of Patent: Jul. 28, 2020

(54) TEST SYSTEM USING PRODUCTION DATA WITHOUT DISTURBING PRODUCTION SYSTEM

(71) Applicant: SAP SE, Walldorf (DE)

(72) Inventor: Wulf Kruempelmann, Altlussheim (DE)

(73) Assignee: SAP SE, Walldorf (DE)

( * ) Notice: Subject to any disclaimer, the term of this patent is extended or adjusted under 35 U.S.C. 154(b) by 717 days.

(21) Appl. No.: 14/733,242

(22) Filed: Jun. 8, 2015

(65) Prior Publication Data

US 2016/0358109 A1    Dec. 8, 2016

(51) Int. Cl.
*G06Q 10/06*    (2012.01)
*G06Q 10/00*    (2012.01)

(52) U.S. Cl.
CPC .............................. *G06Q 10/0633* (2013.01)

(58) Field of Classification Search
CPC ........................... G06Q 10/0633; G06Q 10/00
USPC ....................................................... 705/7.27
See application file for complete search history.

(56) References Cited

U.S. PATENT DOCUMENTS

| 6,868,427 | B2 | 3/2005 | Herzog et al. | |
|---|---|---|---|---|
| 6,951,013 | B1* | 9/2005 | Lozins | G06F 11/3688 717/125 |
| 7,480,898 | B2* | 1/2009 | Batten | G06F 11/3672 714/E11.207 |
| 8,332,462 | B2 | 12/2012 | Kruempelmann | |
| 8,572,156 | B2 | 10/2013 | Kruempelmann et al. | |
| 8,572,565 | B2* | 10/2013 | Bozak | G06F 8/71 705/7.11 |
| 8,924,530 | B2 | 12/2014 | Kruempelmann | |
| 9,201,700 | B2 | 12/2015 | Kruempelmann | |
| 9,665,437 | B2* | 5/2017 | Bhargava | G06F 11/1451 |
| 9,674,169 | B2* | 6/2017 | Leconte | G06Q 10/06 |
| 2001/0044738 | A1* | 11/2001 | Elkin | G06Q 10/06316 705/7.15 |
| 2007/0033586 | A1* | 2/2007 | Hirsave | G06F 21/51 717/174 |
| 2008/0098046 | A1* | 4/2008 | Alpern | G06F 16/217 |

(Continued)

OTHER PUBLICATIONS

Ramkrishna Chatterjee, Gopalan Arun, Sanjay Agarwal, Ben Speckhard, and Ramesh VasudevanAuthor(s) Name(s) Using Applications of Data Versioning in Database Application Development, IEEE (Year: 2004).*

(Continued)

*Primary Examiner* — Rutao Wu
*Assistant Examiner* — Abdallah A El-Hage Hassan
(74) *Attorney, Agent, or Firm* — Fish & Richardson P.C.

(57) ABSTRACT

Implementations of the present disclosure include methods, systems, and computer-readable storage mediums for concurrent production use of an enterprise system and testing of a modified enterprise system. Actions include receiving a test schema that provides one or more application views to application tables of production data in a database, at least one application view including a read-only view, providing one or more local tables for local test data provided during execution of the modified enterprise system, providing one or more triggers to the at least one application view, and executing the enterprise system based on a production database schema and concurrently executing the modified enterprise system based on the test database schema.

20 Claims, 4 Drawing Sheets

(56) References Cited

U.S. PATENT DOCUMENTS

| | | | |
|---|---|---|---|
| 2011/0035744 A1* | 2/2011 | Bhatia | G06F 16/972 717/174 |
| 2011/0125865 A1* | 5/2011 | Garofalo | G05B 19/0426 709/212 |
| 2011/0320419 A1* | 12/2011 | Johnston | G06F 16/219 707/703 |
| 2012/0036166 A1* | 2/2012 | Qiu | G06F 17/30297 707/803 |
| 2012/0131154 A1* | 5/2012 | Kruempelmann | G06Q 10/00 709/220 |
| 2013/0132144 A1 | 5/2013 | Kruempelmann et al. | |
| 2014/0087355 A1* | 3/2014 | Henry | G09B 7/00 434/362 |
| 2014/0149568 A1 | 5/2014 | Kruempelmann et al. | |
| 2015/0106140 A1* | 4/2015 | Biewald | G06Q 10/06 705/7.12 |
| 2016/0085777 A1* | 3/2016 | Engelko | G06F 16/211 707/803 |
| 2016/0132577 A1* | 5/2016 | Kruempelmann | G06F 17/30575 707/625 |

OTHER PUBLICATIONS

Jan Ploski, Offis Institute for Information Technology Wilhelm Hasselbring, University of Oldenburg Jochen Rehwinkel and Stefan Schwierz, Meteocontrol GmbH Introducing Version Control to Database-Centric Applications, IEEE (Year: 2007).* ens Krueger, Florian Huebner, Johannes Wust, Martin Boissier, Alexander Zeier, Hasso Plattner Hasso Plattner Institute for IT Systems Engineering University of Potsdam Potsdam, Germany Main Memory Databases for Enterprise Applications (Year: 2011).*

\* cited by examiner

TEST SYSTEM USING PRODUCTION DATA WITHOUT DISTURBING PRODUCTION SYSTEM

BACKGROUND

Enterprise software systems (enterprise systems) can be used to perform enterprise-level operations. Example enterprise systems can include enterprise resource planning (ERP) systems, client-relationship management (CRM) systems, product lifecycle management (PLM) systems, supply chain management (SCM) systems, and supplier relationship management (SRM) systems. In a production environment, numerous users interact with an enterprise system daily, resulting in hundreds, if not thousands of transactions, and relatively large amounts of data. In some instances, enterprise systems, can be updated and/or customized. For example, a more recent version of an enterprise system may be available, resulting in an update to the enterprise system (e.g., updating from version 1.0 to version 2.0). As another example, an enterprise can customize an enterprise system to include functionality/features that are relevant to the particular enterprise.

In cases of updating and/or customizing (modifying) of an enterprise system the modified enterprise system is tested before being made available for production use. In some examples, testing is performed using production data (e.g., data provided from production use of the enterprise system before updating/customizing). Traditionally, testing of the modified enterprise system is achieved by copying the production system (or tenant, if the software is tenant enabled) to an empty system (or tenant) and begin testing with semi-production data. This, however, has several disadvantages.

For example, the setup of such a test system (or tenant) requires copying of the entire production system (or tenant), which might consume significant memory (e.g., up to several terabytes (TB)). Further, the copy-procedure may require a significant amount of time (e.g., a few hours to several days). During this time, the production use of the source system would create inconsistent data within the copy. Consequently, production use of the system is either halted, leading to significant downtime, or the testing is performed using inconsistent data. A further disadvantage is that the test environment requires as much memory, disk storage and nearly the same computing power as the production system. This can drastically increase the amount of hardware required to conduct the testing. Also, the operation of such a test system can require a significant amount of manpower for setup, monitoring and refresh of the system.

SUMMARY

Implementations of the present disclosure include computer-implemented methods for concurrent production use of an enterprise system and testing of a modified enterprise system. In some implementations, methods include actions of receiving a test schema that provides one or more application views to application tables of production data in a database, at least one application view including a read-only view, providing one or more local tables for local test data provided during execution of the modified enterprise system, providing one or more triggers to the at least one application view, and executing the enterprise system based on a production database schema and concurrently executing the modified enterprise system based on the test database schema.

These and other implementations can each optionally include one or more of the following features: the read-only view is accessed by the modified enterprise system to read at least a portion of the production data from a production table; actions further include providing at least one union view to write test data to a local table in union with at least a portion of the production data; concurrent execution of the modified enterprise system is performed without interfering with production use of the enterprise system; the one or more triggers include one or more of a write-access trigger, a read-access trigger, and an instead-of trigger; if, during execution of the modified enterprise system, write-access is requested to a production table, the write-access trigger causes at least a portion of the production data to be written as test master data to a respective local table, and if, during execution of the modified enterprise system, read-access is requested to a production table, the read-access trigger causes data to be read from a local table and from a production table, and the read data is merged to the local table; and actions further include, for each production table that can be effected by execution of the modified database system, a respective local table and a respective write-trigger are provided.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to testing modified enterprise systems without disturbing a corresponding production enterprise system. More specifically, implementations of the present disclosure are directed to testing updates to and/or customization of an enterprise system with production data using a test database schema in parallel with a production database schema. In some implementations, the test database schema includes read-only views to the production data and copies of a repository. In some implementations, the test database schema includes union views to write test data to new tables in union with the production data. In this manner, testing of the updates/customization can be performed using the production data without interfering with production use of the enterprise system and without copying of large amounts of data. In some examples, implementations of the present disclosure enable testing and production use of an enterprise system to be performed on the same database.

Implementations of the present disclosure reduce the need for additional hardware (e.g., memory, processors) for testing updates to and/or modifications of enterprise system, thereby reducing hardware costs, as well as reducing the amount of maintenance (e.g., human input). In some examples, maintenance is reduced to triggering automated procedures to setup and delete the test environment, and transporting the modified software (e.g., software with the update/customization) into the test environment. Further, modified enterprise systems can be tested using production data (e.g., actual customer data). In this manner, testing accurately reflects data eventual production use of the modified enterprise system. Further, production data is not copied for testing. In this manner, time and resources required to copy and store potentially terabytes of data is foregone. Also, production user of an enterprise system can be concurrent with a modified enterprise system, resulting in little to no downtime experienced by users of the production enterprise system.

Figure 1:
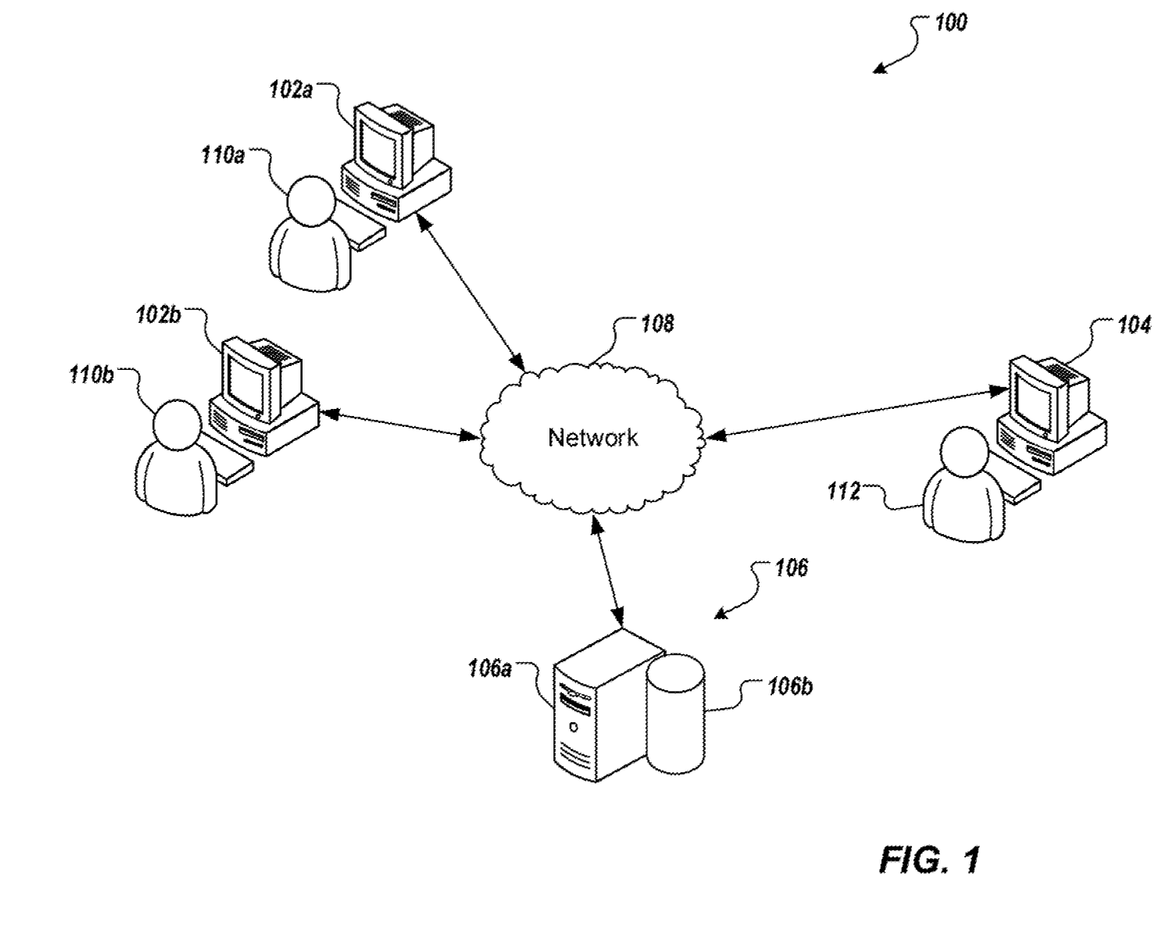
FIG. 1 depicts an example architecture that can be used to realize implementations of the present disclosure.

FIG. 1 depicts an example architecture 100 that can be used to realize implementations of the present disclosure. The example architecture 100 includes client devices 102a, 102b and a client device 104 communicably connected to a back-end system 106 by a network 108. The client devices 102a, 102b are operated by users 110a, 110b, respectively, and the client device 104 is operated by a user 112. In some examples, the client devices 102a, 102b, 104 can each be a computing device such as a laptop computer, a desktop computer, a smartphone, a personal digital assistant, a portable media player, a tablet computer, or any other appropriate computing device that can be used to communicate with the back-end system 106. In some examples, the back-end system 106 can include one or more computing devices 106a, such as a server, and one or more database systems 106b. In some examples, the back-end system 106 can represent more than one computing device working together to perform the actions of a server (e.g., cloud computing).

In some implementations, the database system 106b is provided as an in-memory database system. In some examples, an in-memory database is a database management system that uses main memory for data storage. In some examples, main memory includes random access memory (RAM) that communicates with one or more processors (e.g., central processing units (CPUs)) over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage database systems.

In some examples, the network 108 can be a public communication network (e.g., the Internet, cellular data network, dialup modems over a telephone network), a wide area network (WAN), a local area network (LAN), a private communications network (e.g., private LAN, leased lines), or any appropriate combination thereof.

In accordance with implementations of the present disclosure, the back-end system 106 can host one or more enterprise systems. In some examples, an enterprise system can be provided as one or more computer-executable programs executed by one or more computing devices. Example enterprise systems can include an enterprise resource planning (ERP) system, a client-relationship management (CRM) system, a product lifecycle management (PLM) system, a supply chain management (SCM) system, and supplier relationship management (SRM) system.

In some implementations, an enterprise system can be provided in a production mode, during which users interact with the enterprise system to access functionality provided by the enterprise system, access data through the enterprise system, and/or generate/modify data using the enterprise system. During operation in the production mode, data that is accessed/generated/modified can be referred to as production data. In other words, production data is data that is accessed/generated/modified during real-world execution of the system.

In an example, the users 110a, 110b can be employees of an enterprise, which uses an enterprise system hosted on the back-end system 106 for business operations. For example, the user 110a can use the client device 102a to interact with the enterprise system and access production data (e.g., access a customer profile) stored at the back-end system 106. As another example, the user 110b can use the client device 102b to interact with the enterprise system and generate production data (e.g., create a new customer profile) that is stored at the back-end system 106. In some examples, data is read from and written to the database system 106b during production use of the enterprise system.

In some implementations, after the enterprise system has been operating in the production mode, a modification to the enterprise system may be required. For example, the enterprise system can be updated (e.g., update from an earlier version to a newer version) and/or customized (e.g., implement custom features for a particular entity). Consequently, a modified enterprise system can be provided, which includes one or more modifications (e.g., updates, customizations). In some examples, the modified enterprise system can be operated in a test mode to test the modifications. In some examples, testing of the modified enterprise system is performed using production data. In this manner, it can be confirmed that the modified enterprise system functions as intended with the production data before transitioning from the test mode to the production mode. In some implementations, the user 112 (e.g., an administrator of the enterprise system) can use the client device 104 to perform testing of the modified enterprise system, as described in further detail herein.

As introduced above, implementations of the present disclosure enable testing of a modified enterprise system using production data. More particularly, implementations of the present disclosure enable testing of a modified enterprise system using production data, while the enterprise system (e.g., unmodified enterprise system) continues to operate in the production mode. In accordance with implementations of the present disclosure, and as described in further detail herein, a production database schema and a test database schema are provided. In some examples, a database schema is a structure that is supported by a database management system (DBMS) and refers to the organization of data stored in the database. The database schema, for example, logically groups items (e.g., tables, views, stored procedures). In some examples, a user (e.g., the user 110*a*, 110*b*, 112) can be assigned permissions to a respective database schema, such that the user can only access the objects they are authorized to access.

In accordance with implementations of the present disclosure, the production database schema defines the logical groupings of objects for the database (e.g., the database 106*b*), when the enterprise system is operating in the production mode. The test database schema defines the logical groupings of objects for the database (e.g., the database 106*b*), when the modified enterprise system is operating in the test mode. In some examples, interactions of users (e.g., the user 110*a*, 110*b*) making production use of the enterprise system, and thus the database (e.g., the database 106*b*), during the production mode, will be governed by the production database schema. Likewise, users (e.g., the user 112) testing the modified enterprise system, and thereby interacting with production data stored in the database (e.g., the database 106*b*), during the testing mode, will be governed by the test database schema.

Figures 2A, 2B:
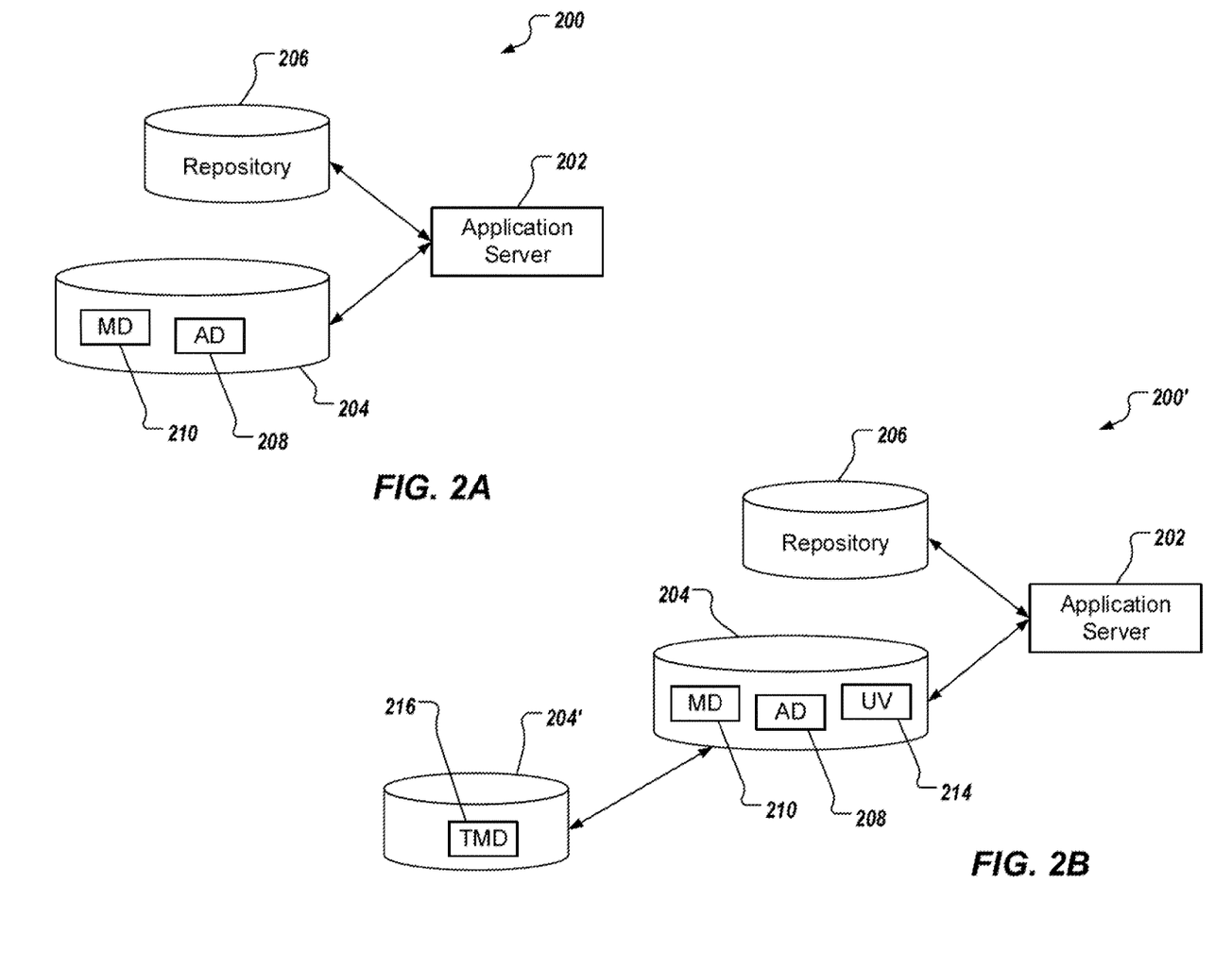
FIGS. 2A and 2B schematically depict respective example schemas in accordance with implementations of the present disclosure.

FIGS. 2A and 2B schematically depict respective example schemas in accordance with implementations of the present disclosure.

FIG. 2A schematically depicts an example production database schema 200. In the example of FIG. 2A, an application server 202, a database 204, and a repository 206 are provided. In some examples, the application server 202 executes the enterprise system based on data stored in the repository 206, as well as application data 208 and master data 210 stored in the database 204. For example, the application server 202 can include one or more computing devices that execute the enterprise system (e.g., ERP system, CRM system) as one or more computer-executable programs, which access data stored in the database 204 and the repository 206.

In some examples, the database 204 stores production data that is accessed/generated/deleted/modified during production use of the enterprise system. For example, the database 204 stores data in tables that include rows and columns. In some examples views to one or more tables is provided. A view can be provided as a result set of a stored query to the one or more tables. In some examples, a view can be described as a virtual table that is dynamically compiled from data of the one or more tables that the view points to (queries), when access to the view is requested. In some examples, a view can include read and/or write access to the underlying one or more tables. In the depicted example, the database 204 stores the application data 208 and the master data 210.

In some examples, application data 208 includes actual data values for variables. For example, and in a business context, application data 208 can include customer names, addresses, telephone numbers, email addresses, and the like. In some examples, master data 210 includes data objects (referred to herein as objects). In some examples, an object is a data structure that holds a set of instance variables or properties (also referred to as attributes), and associations with other objects. An object can, for example, be used in conjunction with a data access layer and a logic layer to transport data. Example objects can include business objects. In some examples, the repository 206 stores data that is used for execution of the enterprise system. For example, the repository 206 stores information about data structures used during execution of the enterprise system, as well as coding that is sued to process data during execution of the enterprise system.

In some implementations, and in the production mode, the application server 204 executes the enterprise system based on data stored in the database 204 and the repository 206. In the production mode, execution of the enterprise system is based on the production database schema 200, which logically groups objects (e.g., tables, views, stored procedures) during production use.

FIG. 2B schematically depicts an example test database schema 200'. In the example of FIG. 2B, the application server 202, the database 204, and a repository 206' are provided. In some examples, the repository 206' is provided as a copy of the repository 206 of FIG. 2A. A database 204' is also provided. In some examples, the database 204 and the database 204' are provide in the same database system (e.g., the database system 106*b* of FIG. 1). In the example of FIG. 2B, the database 204 stores the application data 208, the master data 210, as well as a union view 214. In some examples, the union view 214 links a local table (in the test database schema) to a production table (in the production database schema), as described in further detail herin. The database 204' stores test master data 216 (e.g., in local tables). In some examples, and as described in further detail herein, the test master data 216 includes master data (production data) that is written/modified during execution of the modified enterprise system during the test mode based on the test database schema 200'.

In accordance with implementations of the present disclosure, a modified enterprise system (e.g., an enterprise system that includes updates/customizations) is tested in a test mode using the test database schema 200'. Example modifications can include renaming tables and creating/deleting/editing views from the production database schema 200. In some examples, the modified enterprise software is imported to the test database schema 200' for execution in the test mode.

In some implementations, a test database schema is provided. For example, and as described herein, the test database schema can be created (e.g., by a testing user). In some implementations, setting up the test database schema also includes copying repository tables, creating application views to application tables (e.g., application data 208) of the production database schema, creating local tables for local test data (e.g., test master data), and creating one or more triggers to application views of the test database schema. In some examples, each application view is provided as a read-only view to production tables of the production enterprise system.

In some implementations, a local table is provided for each production table that would be effected by execution of the modified enterprise system in the test mode (e.g., a production table that the modified enterprise system would write data to during execution in the test mode). Accordingly, a local table is provided for each production table that would be effected by execution of the modified enterprise system in the test mode. Each local table stores test master data that is written to memory during execution of the modified enterprise system in the test mode. For example, local tables are provided in the database 204' of FIG. 2B for storing the test master data 216. In some examples, if the modified enterprise system includes changes to the structure of an application table, a local table and local view can be extended, or the production application table can be extended to provide a modified table, and a view can be created to the modified table in the production database schema.

In some implementations, a local table is linked to a respective production table using a union view between the tables. In some examples, the union view is a read-only view with respect to the respective production table, and is a read-write view to the respective local table. In some examples, the union view merges read-only production data and newly written test data in the local table.

In some implementations, triggers include a write-access trigger, a read-access trigger, and an instead-of trigger. In some examples, if during execution of the modified enterprise system in the test mode, write-access is requested to a production table (e.g., writing data to the production database), the write-access trigger causes the data to be written as test master data to the respective local table (e.g., the local table that was created in view of the production table). In this manner, production data is only used in a read-only manner and is not modified in the production database (e.g., the database 204 of FIGS. 2A and 2B) as a result of execution of the modified enterprise system in the test mode. Any modified production data is written as test master data to the local tables (e.g., in the database 204' of FIG. 2B). In some examples, if during execution of the modified enterprise system in the test mode, read-access is requested to data (e.g., reading data from the database(s)), the read-access trigger causes the data to be read from the local table (e.g., stored in the database 204') and from the production table (e.g., stored in the database 204), and the read data is merged to the local table based on the union view. In some examples, if data provided from the local table conflicts with data provided from the production table, the data provided from the local table is used, if the keys are the same. That is, if the data from the local table and the data from the production table have the same key, the data from the local table is used for the union view. If the data from the local table and the data from the production table do not have the same key, the data from the production table is used. In some examples, the instead-of trigger is responsive to one or more requested actions, and performs at least one action that is different from the one or more requested actions.

In some implementations, after testing of the modified enterprise system is complete execution of the modified enterprise system using the test database schema is halted. In accordance with implementations of the present disclosure, the production data is not modified during testing of the modified enterprise system. Further, execution of the enterprise system using the production database schema can continue concurrent with testing of the modified enterprise system using the test database schema. In this manner, for example, no downtime of the enterprise system is required for testing the modified enterprise system, and customers can interact with the enterprise system in the production mode without noticing or being effected by the testing. Further, as production data is updated (e.g., modified) during concurrent production use of the enterprise system and testing of the modified enterprise system, the updated production data can also be used during testing of the modified enterprise system.

Figure 3:
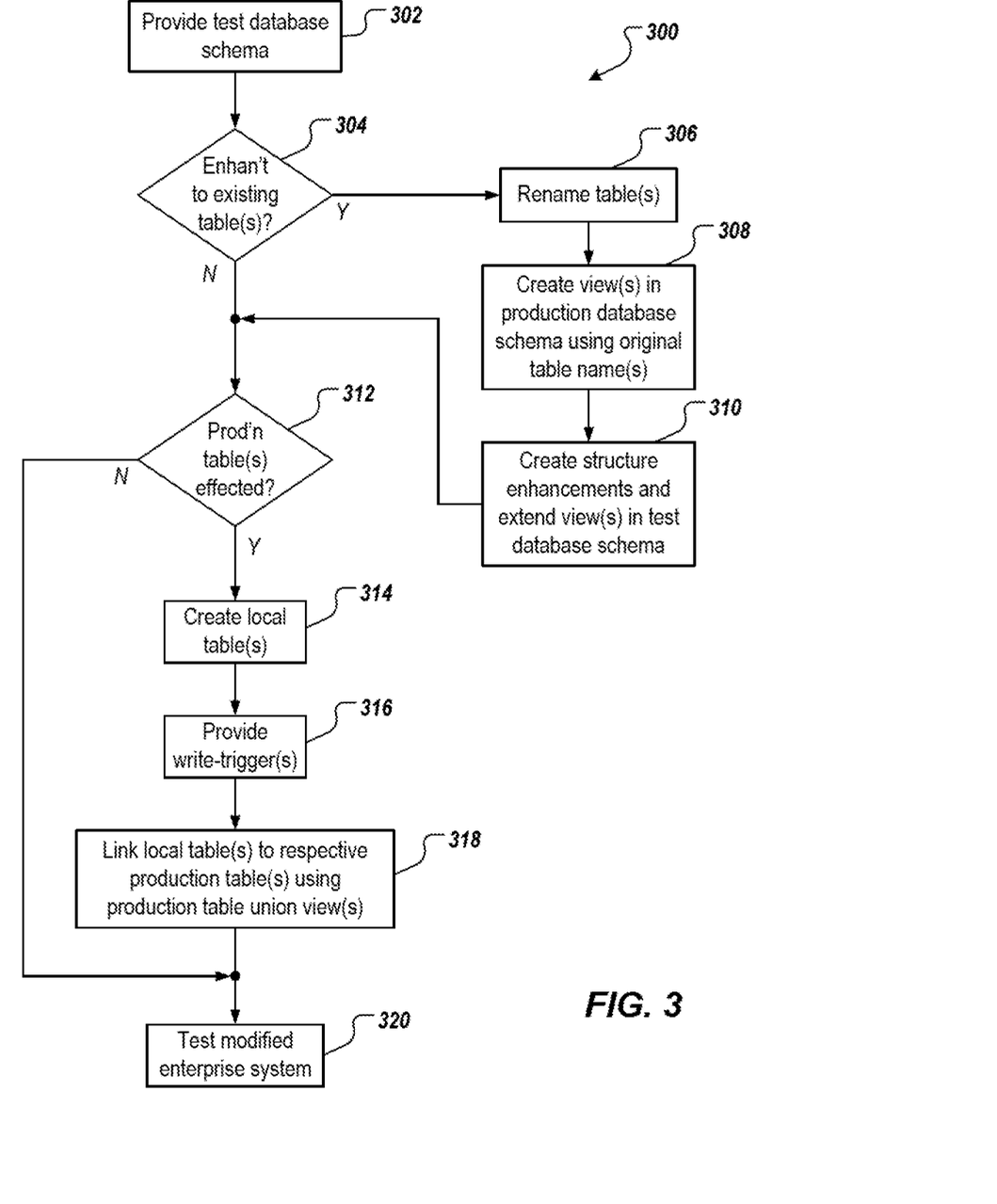
FIG. 3 depicts an example process that can be executed in accordance with implementations of the present disclosure.

FIG. 3 depicts an example process 300 that can be executed in accordance with implementations of the present disclosure. In some implementations, the example process 300 can be realized using one or more computer-executable programs executed using one or more computing devices.

A test database schema is provided (302). For example, the test database schema provides a logical grouping objects (e.g., tables, views, stored procedures) to be used during execution of a modified enterprise system in a test mode. It is determined whether there are enhancements to one or more existing tables (304). For example, the modified enterprise system is based on a production enterprise system and includes updates(s) and/or modification(s) of the production enterprise system. In some examples, an existing table is provided as a table of the production enterprise system, and an enhancement can include, for example, a modification of the table (e.g., a new column being added to the table). In some examples, if the modified enterprise system includes enhancements to one or more tables, each table that is to be enhanced is renamed (306). For example, the name of a table that is to be enhanced is changed from "Table" to "Table_New." Respective views are created in a production database schema using the original table names (308). For example, a table view can be provided called "Table" in the production database schema. Respective structures of the one or more tables are modified and respective views are extended in the test database schema (310). For example, a column is added to the table "Table_New," and a table view to the table "Table_New" is extended based on the added column. Accordingly, the table view "Table" partially views the extended table "Table_New" (e.g., it does not view the extension (added column). In this manner, the enhancement to the table is transparent to the production enterprise system, which is executed based on the production database schema.

It is determined whether one or more production tables are effected by the modified enterprise system (312). For example, it is determined whether execution of the modified enterprise system would write data to the one or more production tables. If execution of the modified enterprise system writes data to a production table, testing of the modified enterprise system would result in inconsistency of the data. Consequently, if execution of the modified enterprise system would write data to the one or more production tables, respective local tables are created (314). For example, each local table corresponds to a respective production table. Respective write-triggers are provided (316). In some examples, a write-trigger results in data (e.g., test data) being written to a local table, if the modified enterprise system requests write access to the respective production table. Each local table is linked to its respective production table using a respective union views. In some examples, the union view is a read-only view with respect to the respective production table, and is a read-write view to the respective local table. In some examples, the union view merges read-only production data and newly written test data in the local table.

The modified enterprise system is tested (320). For example, the modified enterprise system is tested using the test database schema based on production data. As described herein, production use of the enterprise system can concurrently occur using the production database schema.

In some implementations, during testing of the modified enterprise system read-access can be requested to production data. For example, read-access is requested to the enhanced table "Table_New," which stores production data, and the table view "Table_New" of the test database schema is used to read the production data. Further, during production use of the enterprise system, read access to the production data stored in the enhanced table "Table_New" is provided using the view "Table" of the production database schema. In this manner, the enhanced table is transparent to the production enterprise system. During testing of the modified enterprise system read-access can be requested to data that is stored in a local table (e.g., which corresponds to a respective production table). In some examples, a read-trigger causes data to be read from the local table and from the respective production table, and the data is merged, where, if the data from the local table has the same key as the data from the production table, the data from the local table is provided in response to the read request. During testing of the modified enterprise system write-access can be requested to write data to a production table. In some examples, a write-trigger causes the data to be written (e.g., as test data) to the respective local table.

Figure 4:
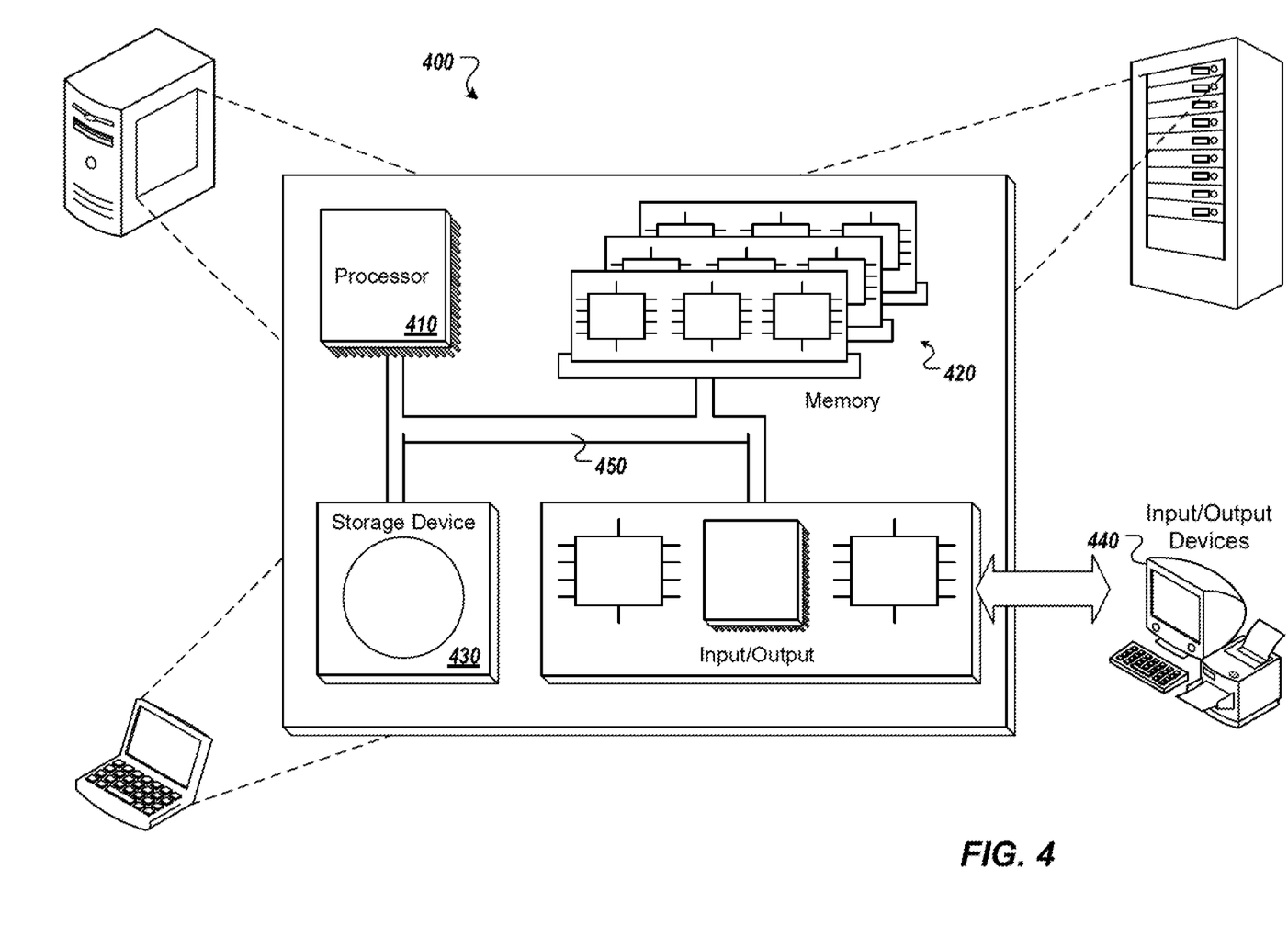
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device) for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:
1. A computer-implemented method for concurrent production use of an enterprise system and testing of a modified enterprise system, the method being executed using one or more processors and comprising:

receiving, by the one or more processors, a test schema that provides one or more application views to application tables of production data in a database and defines a user authorization to access a plurality of objects comprising one or more local tables in the database and one or more application views, at least one application view comprising a read-only view;

selectively providing, by the one or more processors, the one or more local tables in the database based on a data conflict identification in each local table relative to a respective production table of the database and, for an identified data conflict, a comparison of keys of each local table and of the respective production table, for local test data provided during execution of the modified enterprise system;

providing, by the one or more processors, one or more triggers to the at least one application view; and executing, by the one or more processors, the enterprise system based on a production database schema and concurrently executing the modified enterprise system based on the test database schema without interfering with a use of the production data in the database by the enterprise system to minimize a downtime of the production database schema, testing being performed using the production data in the same database used by the enterprise system without copying the production data, and production data that is one or more of written and modified during testing of the modified enterprise system is stored as test master data in a test database.

2. The method of claim 1, wherein the read-only view is accessed by the modified enterprise system to read at least a portion of the production data from a production table.

3. The method of claim 1, further comprising providing at least one union view to write test data to a local table in union with at least a portion of the production data.

4. The method of claim 1, wherein concurrent execution of the modified enterprise system is performed without interfering with production use of the enterprise system.

5. The method of claim 1, wherein the one or more triggers comprise one or more of a write-access trigger, a read-access trigger, and an instead-of trigger.

6. The method of claim 5, wherein:
if, during execution of the modified enterprise system, write-access is requested to a production table, the write-access trigger causes at least a portion of the production data to be written as test master data to a respective local table; and
if, during execution of the modified enterprise system, read-access is requested to a production table, the read-access trigger causes data to be read from a local table and from a production table, and the read data is merged to the local table.

7. The method of claim 1, further comprising, for each production table that can be effected by execution of the modified database system, a respective local table and a respective write-trigger are provided.

8. A non-transitory computer-readable storage medium coupled to one or more processors and having instructions stored thereon which, when executed by the one or more processors, cause the one or more processors to perform operations for concurrent production use of an enterprise system and testing of a modified enterprise system, the operations comprising:
receiving a test schema that provides one or more application views to application tables of production data in a database and defines a user authorization to access a plurality of objects comprising one or more local tables in the database and one or more application views, at least one application view comprising a read-only view;

selectively providing the one or more local tables in the database based on a data conflict identification in each local table relative to a respective production table of the database and, for an identified data conflict, a comparison of keys of each local table and of the respective production table, for local test data provided during execution of the modified enterprise system;

providing one or more triggers to the at least one application view; and executing the enterprise system based on a production database schema and concurrently executing the modified enterprise system based on the test database schema without interfering with a use of the production data in the database by the enterprise system to minimize a downtime of the production database schema, testing being performed using the production data in the same database used by the enterprise system without copying the production data, and production data that is one or more of written and modified during testing of the modified enterprise system is stored as test master data in a test database.

9. The computer-readable storage medium of claim 8, wherein the read-only view is accessed by the modified enterprise system to read at least a portion of the production data from a production table.

10. The computer-readable storage medium of claim 8, wherein operations further comprise providing at least one union view to write test data to a local table in union with at least a portion of the production data.

11. The computer-readable storage medium of claim 8, wherein concurrent execution of the modified enterprise system is performed without interfering with production use of the enterprise system.

12. The computer-readable storage medium of claim 8, wherein the one or more triggers comprise one or more of a write-access trigger, a read-access trigger, and an instead-of trigger.

13. The computer-readable storage medium of claim 12, wherein:
if, during execution of the modified enterprise system, write-access is requested to a production table, the write-access trigger causes at least a portion of the production data to be written as test master data to a respective local table; and
if, during execution of the modified enterprise system, read-access is requested to a production table, the read-access trigger causes data to be read from a local table and from a production table, and the read data is merged to the local table.

14. The computer-readable storage medium of claim 8, wherein operations further comprise, for each production table that can be effected by execution of the modified database system, a respective local table and a respective write-trigger are provided.

15. A system, comprising:
a client-side computing device; and
a computer-readable storage device coupled to the client-side computing device and having instructions stored thereon which, when executed by the client-side computing device, cause the client-side computing device to perform operations for concurrent production use of an enterprise system and testing of a modified enterprise system, the operations comprising:

receiving a test schema that provides one or more application views to application tables of production data in a database and defines a user authorization to access a plurality of objects comprising one or more local tables in the database and one or more application views, at least one application view comprising a read-only view;

selectively providing the one or more local tables in the database based on a data conflict identification in each local table relative to a respective production table of the database and, for an identified data conflict, a comparison of keys of each local table and of the respective production table, for local test data provided during execution of the modified enterprise system;

providing one or more triggers to the at least one application view; and executing the enterprise system based on a production database schema and concurrently executing the modified enterprise system based on the test database schema without interfering with a use of the production data in the database by the enterprise system to minimize a downtime of the production database schema, testing being performed using the production data in the same database used by the enterprise system without copying the production data, and production data that is one or more of written and modified during testing of the modified enterprise system is stored as test master data in a test database.

16. The system of claim 15, wherein the read-only view is accessed by the modified enterprise system to read at least a portion of the production data from a production table.

17. The system of claim 15, wherein operations further comprise providing at least one union view to write test data to a local table in union with at least a portion of the production data.

18. The system of claim 15, wherein concurrent execution of the modified enterprise system is performed without interfering with production use of the enterprise system.

19. The system of claim 15, wherein the one or more triggers comprise one or more of a write-access trigger, a read-access trigger, and an instead-of trigger.

20. The system of claim 19, wherein:
if, during execution of the modified enterprise system, write-access is requested to a production table, the write-access trigger causes at least a portion of the production data to be written as test master data to a respective local table; and
if, during execution of the modified enterprise system, read-access is requested to a production table, the read-access trigger causes data to be read from a local table and from a production table, and the read data is merged to the local table.

* * * * *